(12) United States Patent
Gebhart

(10) Patent No.: US 8,839,931 B2
(45) Date of Patent: Sep. 23, 2014

(54) ELECTROMAGNETIC FRICTION CLUTCH HAVING OSCILLATING POLE FACES

(75) Inventor: Manfred Gebhart, Constance (DE)

(73) Assignee: Kendrion Linnig GmbH, Markdorf (DE)

( * ) Notice: Subject to any disclaimer, the term of this patent is extended or adjusted under 35 U.S.C. 154(b) by 304 days.

(21) Appl. No.: 13/266,216

(22) PCT Filed: Jan. 15, 2010

(86) PCT No.: PCT/EP2010/000181
§ 371 (c)(1),
(2), (4) Date: Dec. 28, 2011

(87) PCT Pub. No.: WO2010/124749
PCT Pub. Date: Nov. 4, 2010

(65) Prior Publication Data
US 2012/0132494 A1  May 31, 2012

(30) Foreign Application Priority Data
Apr. 29, 2009  (DE) .......................... 10 2009 019 139

(51) Int. Cl.
*F16D 27/112* (2006.01)
*F16D 27/00* (2006.01)

(52) U.S. Cl.
CPC ........ *F16D 27/112* (2013.01); *F16D 2027/008* (2013.01)
USPC ..................................... 192/84.9; 192/66.21

(58) Field of Classification Search
CPC .............................. F16D 27/11; F16D 27/118
USPC ........... 192/66.21, 84.9, 84.92, 84.96, 84.961
See application file for complete search history.

(56) References Cited

U.S. PATENT DOCUMENTS

| | | | | |
|---|---|---|---|---|
| 566,508 A * | 8/1896 | Esty | ........................... | 192/66.21 |
| 1,756,907 A * | 4/1930 | Payne | ........................ | 192/84.91 |
| 3,214,084 A | 10/1965 | Smirl | | |
| 3,451,516 A * | 6/1969 | Watson | ....................... | 192/84.96 |
| 3,750,788 A | 8/1973 | Heinemann | | |
| 4,635,774 A * | 1/1987 | Sekiguchi et al. | ........... | 192/52.2 |
| 5,059,842 A * | 10/1991 | Uehara | .................... | 192/84.961 |
| 5,125,255 A | 6/1992 | Brown et al. | | |
| 6,409,004 B1 | 6/2002 | Kawada et al. | | |

FOREIGN PATENT DOCUMENTS

| | | |
|---|---|---|
| DE | 2055678 B1 | 3/1972 |
| DE | 202004009184 U1 | 10/2004 |
| DE | 102004042687 A1 | 3/2006 |
| DE | 102005025546 A1 | 12/2006 |
| EP | 0216514 A1 | 4/1987 |
| EP | 1116895 A1 | 7/2001 |

* cited by examiner

*Primary Examiner* — Richard M. Lorence
(74) *Attorney, Agent, or Firm* — Bachman & LaPointe, P.C.

(57) ABSTRACT

An electromagnetic friction clutch (1) is proposed having two clutch plates (2, 8) which have concentrically circular, magnetically soft ring areas (3a-3c, 9a-9d) which are at least partially magnetically insulated from one another, which friction clutch (1) transmits comparatively large torques while having a compact design. For this purpose, pole faces (4a-4f, 10a-10f) which, when viewed in the radial cross section, oscillate in the axial direction are formed at the magnetically soft ring areas (3a-3c, 9a-9d).

8 Claims, 2 Drawing Sheets

ELECTROMAGNETIC FRICTION CLUTCH HAVING OSCILLATING POLE FACES

BACKGROUND OF THE INVENTION

The invention relates to an electromagnetic friction clutch.

Various electromagnetic friction clutches are known whose clutch plates have an uneven friction face. Electromagnetic clutches are known whose armature plates are permeated repeatedly by the magnetic flux. The pole faces of said electromagnetic clutches are of planar design. The multiple permeation increases the friction torque.

SUMMARY OF THE INVENTION

The invention is based on the objective of making available a clutch which transmits a comparatively increased maximum torque while having a space-saving design.

This objective is achieved by the features disclosed herein. Advantageous and expedient developments of the invention are also specified herein.

The invention is based on an electromagnetic friction clutch having two clutch plates, wherein one clutch plate comprises an axially movable armature plate. The clutch plates have a plurality of concentrically circular, magnetically soft ring areas which are at least partially magnetically insulated from one another. The axially movable armature plate has at least one magnetically conductive ring area which magnetically connects two magnetically insulated ring areas of the second clutch plate. The core of the invention then consists in the fact that the clutch plates have, when viewed in the radial cross section, oscillating pole faces at the magnetically soft ring areas, via which pole faces attraction occurs during shifting of the clutch.

In the text which follows, the side of one clutch plate which faces the respectively opposite clutch plate is referred to as a working side. The oscillation of the pole faces is to be understood as meaning that the clutch plates have, in cross section along the surface of their respective working side, a profile which, as the radius increases, has areas which rise and fall alternately in the axial direction. The effect of this is that the surfaces of the clutch plates exhibit, on their working side, concentric elevated portions and depressions. Running around the rotational axis, the surface profile of the clutch plates is preferably predominantly uniformly smooth, in particular in areas in which the clutch plates are in contact in the coupled state. The rotational symmetry of the clutch plates on the working side can be disrupted in areas which are set back axially, in particular with respect to the friction faces.

Compared to planar friction faces, the profile which oscillates axially over the radius has the advantage that the face via which magnetic attraction can take place is enlarged. In particular, if the concentric elevated portions and depressions on the two clutch plates are offset with respect to one another in such a way that they extend at least partially one into the other and the surfaces of their working sides engage in one another in the coupled state, the oscillating pole faces provide the advantage that the frictional engagement is less sensitive to shocks and vibrations in the perpendicular direction with respect to the rotational axis.

An embodiment of the invention in which the magnetically soft ring areas of a clutch plate have, in the cross sectional profile, a maximum in the axial direction between the magnetic insulating means of a ring area of a clutch plate is particularly expedient. In this context, the magnetically soft ring areas are advantageously provided with an axial cross-sectional profile which has, as the radius increases, a rising edge and a falling edge in the axial direction, and forms a maximum between these edges. As a result, the magnetically conductive area can be predetermined for the clutch plates to engage in one another, wherein the edges act at least partially as pole faces. This results in the advantage over planar pole faces that the magnetic flux no longer has to completely reverse its direction in order to permeate a magnetically conductive region, with the advantageous result that magnetic scattering losses are reduced and the efficiency level of the magnetic generation of force can be improved. In this context, there is also the possibility that in the coupled state the magnetic flux is conducted via a comparatively shorter path through the magnetically soft ring areas which engage in one another, with the result that the effect of areas with undesired magnetic short-circuits can be avoided.

In one particularly preferred embodiment of the invention, the pole faces form at least partially friction faces. Because the strongest attraction forces occur at the pole faces, the magnetic pole faces provide the best conditions for the transmission of torque through frictional contact.

An embodiment of the invention which matches the radial cross-sectional profile of the two clutch plates to one another in an accurately fitting fashion is particularly advantageous. This provides, on the one hand, the advantage that the magnetic pole faces can be kept at a short distance when the two clutch plates are in a separate position. When, for example, the electromagnet is switched on, strong forces therefore act and permit rapid closing of the clutch. Furthermore, the accurately fitting embodiment of the clutch faces has the effect that the surface content which is available can be used in an optimum way for the frictional engagement.

In a more particularly preferred embodiment, the magnetically soft ring areas have conical pole faces. This provides the advantage that the pole faces can be manufactured in a particularly simple and precise fashion.

In the radial cross-sectional profile of the working side of a clutch plate, the conical pole faces preferably appear as edges which rise and fall linearly in the axial direction toward the opposite clutch plate. As a result, their dimensioning can be calculated more easily.

A further preferred embodiment of the invention is defined in that the magnetically soft ring areas of a clutch plate are separated from one another around their circumference by gaps, and in that the ring areas are in the radial direction in a mechanically secure fashion by means of webs. The magnetic insulation of the magnetic soft ring areas is produced here, for example, essentially by erosion of the material, for example milling away. In this context it is possible for material which is provided for the secure mechanical connection of the magnetically soft ring areas to one another to be removed by the erosion of material. The structures of these clutch plates can be dimensioned in such a way that only a few or even no further processing steps are necessary for the manufacture of said clutch plates. At the same time, weight and moment of inertia of the clutch plates are advantageously reduced, which improves their shifting behavior.

It proves favorable that the axially lower edge of a pole face and/or friction face of the magnetically soft ring area of a clutch plate abuts against the edge of a magnetically insulating area in the clutch plate. Consequently, the insulating areas of a clutch plate are located in the depressions of their working side. Because the magnetic flux is essentially conductive through the pole faces on the rising and falling edges of the magnetically soft ring areas, this arrangement of the insulating areas provides the advantage that the magnetic flux is conducted past the insulating areas, and therefore only a small loss due to scattering of flux via the insulating areas can occur.

It is expedient that the axially outermost elevated portion of a magnetically soft ring area of a clutch plate extends only as far as the axially deepest edge of a pole face and/or friction face of the clutch plate lying opposite when the clutch plates are in frictional contact with each other. In the attracted position, the clutch plates preferably engage one in the other in such a way that they form, in the axial direction, a central region which the magnetic flux can permeate with comparatively small changes in direction. The axial range of the magnetically soft areas into the opposite clutch plate can preferably be limited here in such a way that no, or virtually no, scattering of flux can occur in the insulating areas, said scattering of flux reducing the magnetic attraction at the pole faces. This measure also improves the efficiency level of the clutch.

A further expedient embodiment of the invention provides that solid, magnetically insulating material is introduced between magnetically soft ring areas of a clutch plate, and a friction face is formed at least partially in the magnetically insulating area. In this way, the friction face can be enlarged further, and the torque which can be transmitted can therefore be advantageously increased.

DETAILED DESCRIPTION

Figure 1A:
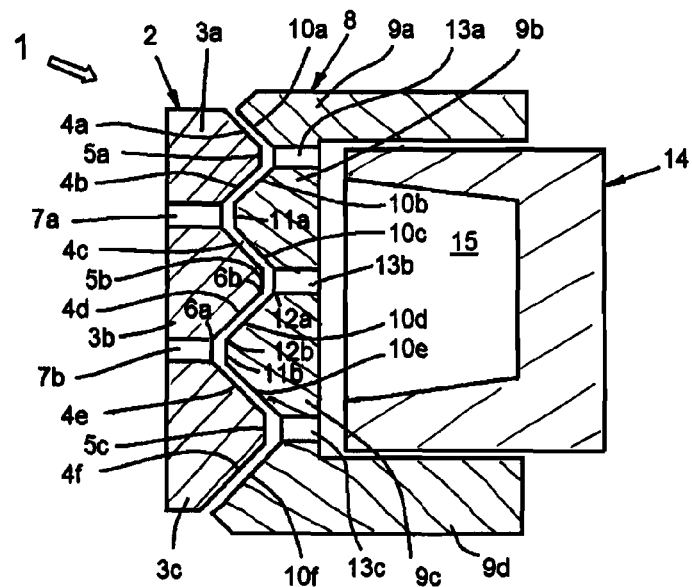
FIG. 1a. shows a schematic illustration of half an electromagnetic friction clutch in the decoupled state in the view of the sectional plane along the rotational axis S and in a radial direction, FIG. 1b. shows the same as FIG. 1a but in the coupled state, and FIG. 2. shows a perspective sectional view of the halved clutch plates in frictional contact, with a view of the cross section along the rotational axis S.
Figure 1B:
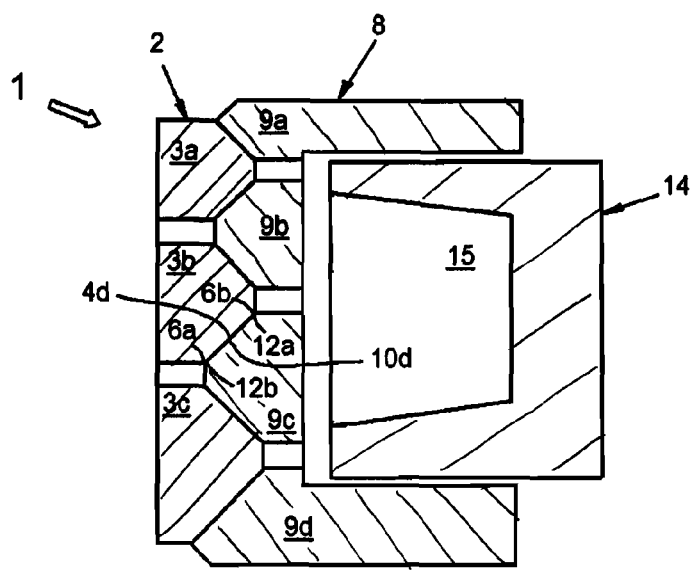

FIGS. 1a. and 1b. show schematically an exemplary embodiment of the invention in the state of a non-shifted clutch 1 in FIG. 1a and a shifted clutch 1 in FIG. 1b. The illustration is limited here to the essential components, the armature disk 2, the rotor 8 and the electromagnet 14 and shows only the contours of a cross section in the space above the rotational axis S.

The armature disk 2 is composed of three magnetically soft ring areas 3a, 3b, 3c which are separated from one another magnetically via the slots 7a and 7b. The rotor 8 has four concentric magnetically soft ring areas 9a, 9b, 9c and 9d. The outermost ring area 9a and the innermost ring area 9d are expanded further in the axial direction, with the result that they partially enclose the electric ring magnet 14 in a U-shaped profile. The magnetically soft ring areas of the rotor 9a, 9b, 9c, 9d are also magnetically insulated from one another by slots 13a, 13b and 13c.

In the uncoupled state, the coils 15 of the electromagnet 14 are de-energized, with the result that the armature disk 2 is held in a spaced-apart position. In order to couple the clutch 1, as illustrated in FIG. 1b, the coil 15 is energized with current. The electromagnet 14 generates the magnetic flux which is conducted, in particular, through the ring areas 9a and 9d of the rotor 8 on the working side thereof. In this context, at the pole faces 10a, 10b, 10c, 10d, 10e and 10f of said rotor an attractive effect comes about which acts on the corresponding pole faces 4a, 4b, 4c, 4d, 4e and 4f of the armature disk 2. The pole faces 4a-4f of the armature disk 2 and those (10a to 10f) of the rotor 8 at the same time assume the function of friction faces.

The linear increase and decrease in the axial material thickness of the magnetically soft ring areas 3a-3c, 9a-9d on the two clutch plates 2, 8 is apparent from the fact that the pole faces 4a-4f, 10a-10f are of conical design. All the pole faces 4a-4f, 10a-10f are positioned at an angle with respect to the rotational axis S. An angle of approximately 45° is illustrated. The pole faces are preferably positioned at angles of less than 60° with respect to the rotational axis, wherein angles of 45° and less have proven more suitable. Attitude angles of 30° and less, for example 27°, are particularly preferred. The pole faces and friction faces which are positioned more steeply engage one in the other here like wedges, as a result of which the torque of the clutch which can be transmitted is increased further. In order to avoid clamping of the clutch plates as far as possible, attitude angles of 20° and greater are preferably used.

Each magnetically soft ring area, for example 3b, of the armature disk 2 is bounded on the working side by two conical faces, for example 4c and 4d, one of which faces the rotational axis S and the other faces away from the rotational axis S. The pole faces 4a-4f on the working side of the armature disk therefore form in cross section an oscillating contour which, as the radius increases, alternately extends toward the rotor disk lying opposite or moves away from it again.

The magnetically soft ring areas 9a, 9b, 9c, 9d of the rotor 8 are bounded in a similar way by pole faces which alternately point toward and away from the rotational axis S in an accurately fitting fashion with respect to the pole faces of the armature disk. The ring elements 9a and 9d each have just one pole face since with their axial extent they concentrate the magnetic flux which is generated by the electromagnet 14 and conduct it to the working sides of the clutch plates 2, 8.

The magnetically soft ring areas 3a-3c, 9a-9d of the rotor 8 and of the armature disk 2 are offset with respect to one another in such a way that the two clutch plates 2, 8 already extend one into the other in the separated state. In this context, in each case a pole face of the rotor 8, for example 10d, and a pole face of the armature disk 2, for example 4d, are respectively located opposite one another in pairs. The inner edge 6a, which for example runs round in a circular shape, of the pole face 4d abuts against the magnetically separating area 7b which forms a depression in the armature disk 2. The pole face 4d of the armature disk 2 abuts, at its outer edge 6b which for example runs around in a circular shape, against the end face 5b which limits the axial elevated portion of the magnetically soft ring area 3b in the direction of the rotor. In a corresponding way, the pole face 10d of the rotor 8 is bounded at its outer edge 12a by the depression in the magnetically insulating area 13b and at its inner edge 12b by the end face 11b of the magnetically soft ring area 9c on the axially outermost elevated portion toward the armature disk 2. The FIG. 1b shows that by virtue of an accurately fitting embodiment of the pole faces 4a-4f and 10a-10f on the two clutch plates 2, 8, all the pole faces are used at the same time as friction faces. When the clutch closes, for example the edges 6a, 6b of the armature pole face 4d meet the edges 12b, 12a of the rotor pole face 10d precisely. As a result, the pole faces 4d, 10d overlap precisely and completely utilize the area available for the frictional engagement.

The areas of greatest material thickness of the magnetically soft rings 3a-3c, 9a-9d each extend here into the depression in the opposite clutch plate, in which depressions the magnetically insulating slots 7a, 7b, 13a, 13b, 13c are located. In this context, end faces 5a, 5b and 5c which adjoin the upper edge of the pole faces 4a, 4b, 4c, 4d, 4e and 4f are located at the areas of maximum material thickness of the armature disk 2. Said pole faces 4a, 4b, 4c, 4d, 4e and 4f cover the radial area of the slots 13a, 13b and 13c of the rotor disk. Equally, the end faces of the rotor 11a, 11b are superimposed congruently on the slots in the armature disk 7a, 7b.

When the power supply of the electromagnet 14 or coil 15 is switched on, the magnetic flux finds a favorable path via the pole faces 4a-4f, 10a-10f of the rotor 8 and of the armature disk 2, on which path said magnetic flux can change to and fro between the magnetically soft areas 3a-3c, 9a-9d of the two clutch plates. As a result of the magnetic attraction force which is generated in this way, the clutch 1 is changed into the state in the FIG. 1b. As a result of the accurately fitting embodiment of the conical pole faces 4a-4f, 10a-10f and of the planar end faces 5a-5c, 11a, 11b of the rotor 8 and of the armature disk 2, the clutch plates then move into frictional contact at all the pole faces, and at the same time provide a favorable path for the magnetic flux, with the result that the friction faces 4a-4f, 10a-10f are pressed one against the other with comparatively strong magnetic attraction forces. As a result of the conical arrangement of the pole faces 4a-4f, 10a-10f, the two clutch plates 2, 8 additionally provide lateral securement to one another and orient themselves in a mechanically centered fashion.

Figure 2:
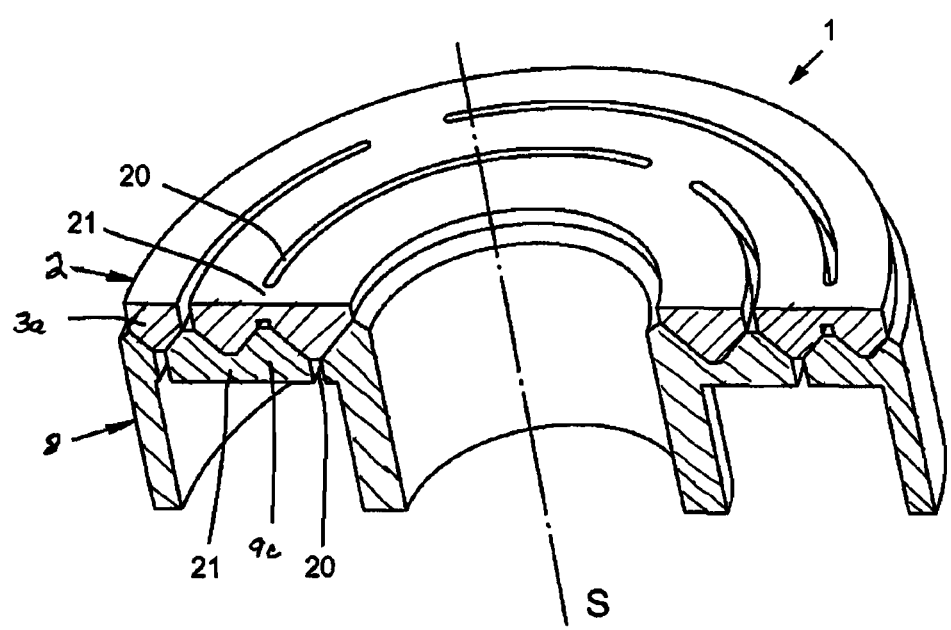

FIG. 2 shows that the magnetic separation between the magnetically soft ring area is embodied as a sequence of circular-arc-shaped slots 20 (which define slots 7a, b and slots 13a, b, c of armature disk 2 and rotor 8, respectively) referred to as kidney slots, wherein a web-like connection 21 is indicated in each case between two slots 20 with the same radius, said web-like connection 21 mechanically connecting two magnetically soft ring areas to one another. The material thickness of the magnetically soft rings is therefore bound by planar end faces in this radial area of the engaging clutch plate. The planar end faces additionally avoid increased magnetic stray flux via the slots 20.

The invention claimed is:

1. An electromagnetic friction clutch having two clutch plates (2, 8) having a plurality of concentrically circular, magnetically soft ring areas (3a-3c, 9a-9d) which are at least partially magnetically insulated from one another, wherein a first clutch plate of the two clutch plates comprises an axially movable armature plate (2) which has at least one magnetically conductive ring area (3a-3c) which magnetically connects two magnetically insulated ring areas (9a-9d) of the second clutch plate (8), wherein, the clutch plates (2, 8,) have, when viewed in a radial cross section, oscillating pole faces (4a-4f, 10a-10f) which are uniformly smooth in the circumferential direction, at the magnetically soft ring areas (3a-3c, 9a-9d, 19), via which attraction occurs during shifting of the clutch, wherein radial cross-sectional profiles of the two clutch plates (2, 8) are matched in an accurately fitting fashion to one another at least in the region of the pole faces (4a-4f, 10a-10f).

2. The electromagnetic friction clutch as claimed in claim 1, wherein the clutch plates (2, 8) each have, in the radial cross section profile of the magnetically soft ring areas (3a-3c, 9a-9d), a maximum in the axial direction, which maximum rises toward the clutch plate lying opposite.

3. The electromagnetic friction clutch as claimed in claim 1, wherein the pole faces (4a-4f, 10a-10f) are each partially embodied as friction faces.

4. The electromagnetic friction clutch as claimed in claim 1, wherein the magnetically soft ring areas (3a-3c, 9a-9d) have conical pole faces (4a-4f, 10a-10f).

5. The electromagnetic friction clutch as claimed in claim 1, wherein the magnetically soft ring areas (3a-3c, 9a-9d) of the clutch plates (2, 8) are separated from one another around their circumference by gaps (7a-7b, 13a-13c, 20), and wherein the ring areas (3a-3c, 9a-9d) are secured in the radial direction by means of webs (21).

6. The electromagnetic friction clutch as claimed in claim 1, wherein an axially outermost elevated portion of the magnetically soft ring area (3a-3c, 9a-9d) of the clutch plates (2, 8) extends at maximum as far as an axially innermost edge of a pole face (4a-4f, 10a-10f) in a depression of the clutch plate lying opposite when the clutch plates (2, 8) are in frictional contact with one another.

7. The electromagnetic friction clutch as claimed in claim 1, wherein an axially deepest edge of the pole face (4a-4f, 10a-10f) of the magnetically soft ring areas (3a-3c, 9a-9d) abuts, against an edge of a magnetically insulating region (7a-7b 13a-13c, 20) of the clutch plate lying opposite.

8. The electromagnetic friction clutch as claimed in claim 1, wherein solid, magnetically insulating material is introduced in magnetically insulating areas (7a-7b), 13a-13c) between the magnetically soft ring areas (3a-3c, 9a-9d) of the clutch plates (2,), and a friction face is formed at least partially in the magnetically insulating area (7a-7b, 13a-13c).

* * * * *